Nov. 10, 1936.  R. W. CHALMERS  2,060,032
CAR LOADING DEVICE
Filed Aug. 20, 1931
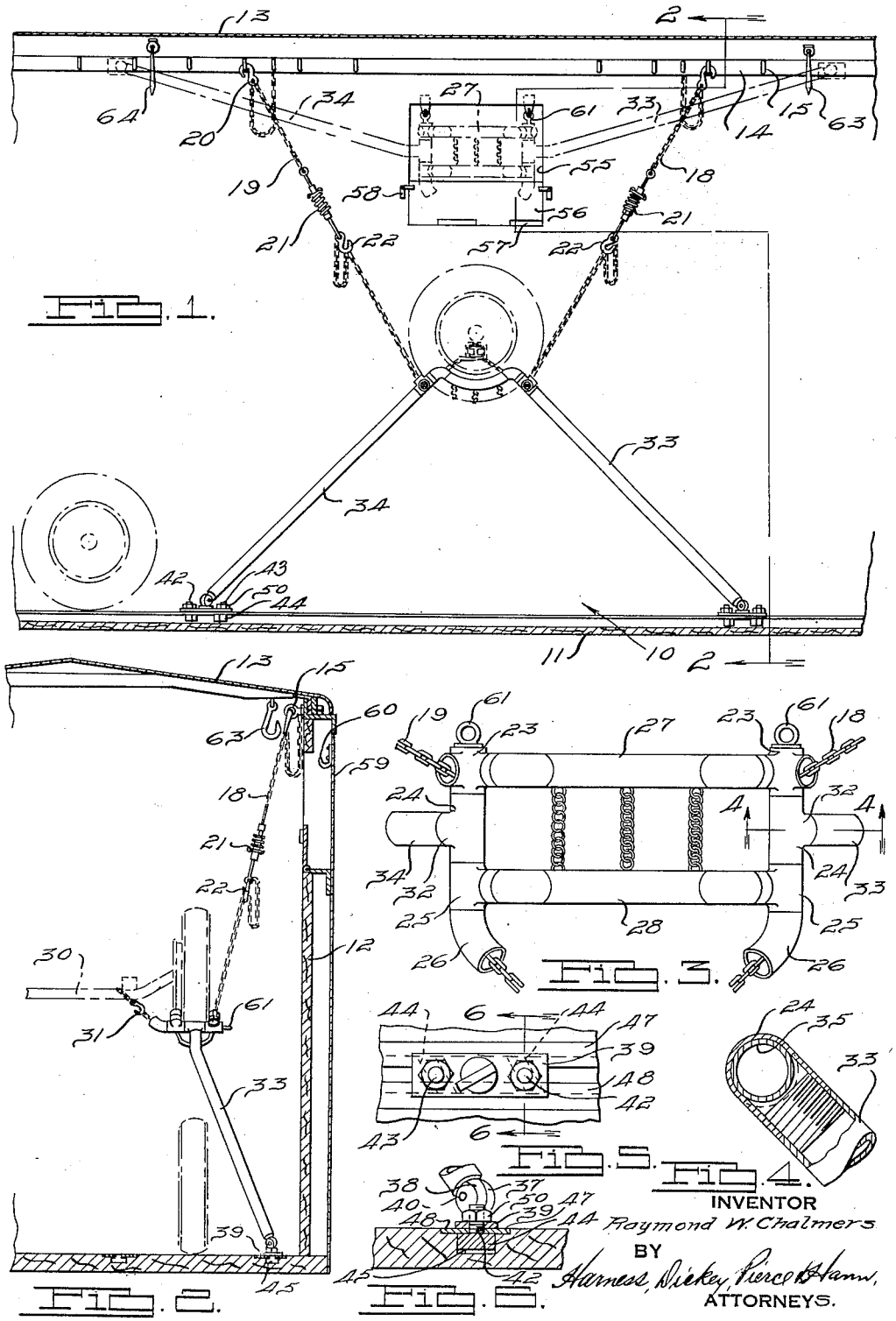
INVENTOR
Raymond W. Chalmers
BY Barnes, Dickey, Pierce & Hann,
ATTORNEYS.

Patented Nov. 10, 1936

2,060,032

UNITED STATES PATENT OFFICE 2,060,032

CAR LOADING DEVICE

Raymond W. Chalmers, Detroit, Mich., assignor, by mesne assignments, to The Worth Company, a corporation of Michigan Application August 20, 1931, Serial No. 558,237

19 Claims. (Cl. 105—368)

The invention relates to loading devices and it has particular relation to devices for securing motor vehicles in freight cars for transportation purposes.

The invention constitutes an improvement over that embodied in my application for patent on Car loading devices, Serial No. 558,238, filed August 20, 1931.

Particularly, the invention is concerned with so suspending an end of a motor vehicle in a freight car that the vehicle will be disposed in a plane oblique to the floor whereby more vehicles can be mounted in a given space. In the other application for patent, chains are anchored to an upper part of the freight car and support vehicle tire embracing devices, each of which comprises associated pipe sections the chains of which project through certain of the sections and engage the axle of the vehicle. Other chains extending downwardly from the device are anchored to a lower part of the freight car. The latter chains are secured to the tire embracing device by pivotal connections and all of the chains are so anchored to the car that the device engaging the tire can be disposed in various positions and the position of the vehicle thereby varied as desired. Additionally, in such application for patent, recesses are provided in the side walls of the car for accommodating the device when not in use.

The principal objects of the present invention are to provide thrust members between the lower part of the car and the tire embracing device instead of the chains previously mentioned, from which it follows that the vehicle not only will be suspended from an upper part of the car, but will be supported by such thrust members anchored to a lower part of the car; to provide an arrangement of this character, in which the parts are so constructed and related, that the construction can readily be folded against a wall of the car and the tire embracing device disposed in a recess in such wall and in an out-of-the-way position; and to provide a car loading device of this character which also is adjustable in such manner that a vehicle can be positioned in various inclined planes with respect to the floor of the freight car.

For a better understanding of the invention reference may be had to the accompanying drawing forming a part of the specification, wherein:

Fig. 1 is a longitudinal, cross sectional view of a freight car having a car loading device therein constructed according to one form of the invention;

Fig. 2 is a cross sectional view taken substantially along the line 2—2 of Fig. 1;

Fig. 3 is a plan view of that part of the device adapted to engage and embrace a tire on the vehicle;

Fig. 4 is a cross sectional view on a larger scale taken substantially along line 4—4 of Fig. 3;

Fig. 5 is a fragmentary plan view of the floor of the freight car, illustrating adjustable means mounted in a groove in the floor, for supporting the lower end of one of the thrust rods;

Fig. 6 is a cross sectional view taken substantially along line 6—6 of Fig. 5.

Referring to Figs. 1 and 2, a freight car is illustrated at 10 which comprises the usual floor 11, side walls 12, and a roof 13. Along the upper edge of each wall 12, a rail 14 is provided which has longitudinally spaced eye bolts 15 secured thereto, with the eye portions of the bolts projecting into the interior of the car. Certain of the eye bolts support chains indicated at 18 and 19 and such chains adjacent their upper ends are provided with hooks 20 for engaging others of the eye bolts for the purpose of changing the anchored positions of the upper ends of the chains as well as their effective lengths. Intermediate the ends of each chain, a spring connection 21 is provided between parts of the chain, as more clearly described and illustrated in my other application for patent. Each of the devices 21 is provided with a hook 22 by means of which the effective length of the lower part of the chain may be varied, it being understood that the chain is at all times connected to a part of the connection 21, so that its effective length may be varied by connecting the hook 22 with different links in the lower part of the chain.

The device for supporting each tire of the vehicle in a suspended position, is shown particularly by Fig. 3, and since it has been particularly described and illustrated in my other application for patent, a detailed explanation of its construction here, is not thought necessary except to the extent of describing additional features. It will be observed, however, that the chains 18 and 19 at their lower ends extend through pipe joints 23, 24, 25 and 26 at each end of pipe sections 27 and 28 which are adapted to embrace the sides of a tire and that each chain is adapted to be swung around an axle of the vehicle indicated at 30 and be secured thereto by means of a hook 31 on the end of the chain which engages a link of the chain after it has been swung about the axle. The pipe joints 24 are provided with legs 32 and to such legs, long sections of pipe 33 and 34 are respectively secured. The joints 24 can turn with respect to the joints 23 and 25, thereby permitting turning of the pipe sections 33 and 34 in vertical planes, and the connection between each joint 24 and the joints 23 and 25, as shown by Fig. 4, comprises a sleeve 35, threaded into the joints 23 and 25, and upon which the joint 24 can rotate.

The lower end of each of the sections 33 and 34 is provided with a bifurcated member 37 and the legs of the latter straddle an element 38 which is secured to a plate 39. A pin 40 pivotally connects the legs of the bifurcated member 37 to the element 38 and hence the rods 33 and 34 can pivot at their lower ends about the pins. The plate 39 is secured by means of bolts 42 and 43 to elongated anchor blocks 44 mounted in a groove 45 in the floor of the freight car. Preferably the bolts 42 and 43 are integral with the blocks 44 respectively, and project upwardly between metal straps 47 and 48 disposed in recesses on opposite sides of the groove and in the upper surface of the floor, and which are secured to the floor by means of bolts (not shown). The straps 47 and 48 project slightly over the groove 45 and maintain the blocks 44 therein, although it should be understood that when desired the blocks may be moved longitudinally of the groove or turned into alignment with the groove when it is desired to remove them. For securing the plate 39 against the upper faces of the strap 47 and 48, nuts 50 are provided on the upper ends of the bolts and when tightened, bind the blocks against the lower surfaces of the straps and the plate 39 against the upper surfaces thereof. The element 38 is journaled in plate 39 so as to permit turning about a vertical axis and hence similar turning of the pipes 33 and 34.

When the device is being used for supporting a tire of a motor vehicle, the pipes 33 and 34 are positioned in diverging relation to the floor and the chains 18 and 19 are positioned in diverging relation to the roof of the car. Also as seen by Fig. 2 the chains and pipe sections are inclined with respect to the surface of the floor and project toward the center portion of the car. The opposite tire on the axle is supported similarly, and it is apparent that the chains and pipe sections at one side will counteract movement of the chain and pipe sections on the other side, toward the walls adjacent thereto. The springs 21 in the chains provide resilient cushions for the vehicle and will resiliently permit some movement of the vehicle although ordinarily the positions of the pipes 33 and 34 at opposite sides of the car will prevent any undesirable movement thereof.

For the purpose of disposing the loading devices in an out-of-the-way position when not in use, recesses 55 are formed in the side walls of the freight car adjacent the upper edge thereof and the lower portion of each recess is normally closed by means of a pivoted cover section 56 hinged as indicated at 57 to the lower edge of the recess and maintained in its closed position by means of latches 58. The base of this recess which constitutes the outer lining of the car as indicated at 59, is provided with hooks 60 adapted to cooperate with eyes 61 shown by Fig. 3, which are secured to the joint members 23 at opposite ends of the pipe section 27.

Assuming that the vehicle is removed and it is desired to put the loading device in an out-of-the-way position, the pipe sections 33 and 34 are disconnected from the floor of the freight car by removing the nuts 50 and turning the blocks 34 until they are aligned with the slot between adjacent edges of the straps 47 and 48, and then the pipe sections are turned upwardly about the sleeves 35 into such positions that the lower side of the tire embracing device as shown by Fig. 2, can be disposed within the recess 55 and against the lining 59 of the freight car wall. Then the eyes 61 are engaged with the hooks 60 and the pivoted cover 56 is moved into its closed position. Pivotal movement of the pipe sections 33 and 34 in the manner previously mentioned, permits disposing them in their broken line positions shown in Fig. 1, and when so positioned their outer ends are engaged by hooks 63 and 64 secured to the roof 13 of the car.

Car loading devices such as those described are particularly efficient in operation and of inexpensive construction. The vehicles are prevented from undesirable movement during transportation and scratching or marring of the vehicles is positively avoided. The arrangement permits mounting vehicles in a freight car in an efficient manner insofar as space is concerned and the accommodation of different sizes of vehicles owing to the ready adjustability of the parts. Moreover, the vehicle supporting devices may easily be disposed in out-of-the-way positions when not in use.

Although but one embodiment of the invention has been described, it is to be understood that various modifications may be made therein without departing from the scope of the appended claims.

I claim:

1. The combination with a freight car or the like, of means for engaging a part of a vehicle in the car, thrust rods pivotally connected to a lower part of the car and to the first mentioned means for supporting said part of the vehicle in elevated position, and resilient means for additionally supporting the vehicle.

2. The combination with a freight car or the like, of means for engaging a part of a vehicle in the car, thrust rods pivotally connected to a lower part of the car and to the first mentioned means for supporting said part of the vehicle in elevated position, and a resilient connection between the engaging means and the car for additionally supporting the vehicle.

3. The combination with a freight car or the like, of means for engaging a tire on the vehicle, thrust rods connected to said means and to a lower part of the car for supporting the tire in elevated position, and flexible means, including a resilient connection, connecting the tire engaging means to an upper part of the car.

4. The combination with a freight car or the like, of means for engaging a tire on the vehicle, thrust rods connected to said means and to a lower part of the car for supporting the tire in elevated position, and flexible means, including a resilient connection, connecting the tire engaging means to an upper part of the car, said flexible means being adjustable in length.

5. The combination with a freight car or the like, of thrust members pivoted to a lower part of the car, means connected to upper parts of the members for supporting a part of a vehicle in elevated position, and resilient connections operatively connected to the vehicle and to upper parts of the car for additionally supporting the vehicle.

6. The combination with a freight car or the like, of thrust members pivoted to a lower part of the car, means connected to upper parts of the members for supporting a part of a vehicle in elevated position, and resilient connections operatively connected to the vehicle and to upper parts of the car for additionally supporting the vehicle, said resilient connections being adjustable in length.

7. The combination with a freight car, of thrust means pivotally connected to a lower part of the car for supporting a vehicle in elevated position, and suspension means connected to an upper part of the car and operatively connected to the vehicle, for modifying the thrust load by suspension of the vehicle, one of said means including a resilient connection.

8. The combination with a freight car, of thrust means pivotally connected to a lower part of the car for supporting a vehicle in elevated position, and suspension means connected to an upper part of the car and operatively connected to the vehicle, for modifying the thrust load by suspension of the vehicle, said suspension means including a resilient connection.

9. In combination with a freight car having a recess in the side wall thereof, of means for engaging the tire of a vehicle wheel in a supporting relation, thrust members detachably and pivotally connected at one end to a lower part of the car and pivotally secured to said means at the other end, and longitudinally adjustable flexible means permanently secured to the car and said tire engaging means for partially suspending the latter, said wheel engaging means being adapted to be stored in said recess when not in use without being disconnected from the car.

10. The combination with a freight car or the like, of means for engaging a tire on the vehicle, thrust rods connected to said means and to a lower part of the car for supporting the tire in elevated position, and flexible means, including a connection readily adjustable as to length, connecting the tire engaging means to an upper part of the car.

11. The combination with a freight car or the like, of a device for engaging and supporting a vehicle wheel in the car, in elevated position, a rigid member connected to the device and to a lower part of the car, and flexible means readily adjustable as to length connecting such device to the wheel axle and to an upper part of the car.

12. The combination with a freight car or the like, of a pair of thrust rods extending upwardly and inwardly from opposite, lower parts of the car respectively, means pivotally connecting the lower ends of the thrust rods to the lower parts of the car for movement in a plane laterally of the car, means at the upper ends of the rods for engaging and supporting a part of a vehicle, flexible means operatively connected to opposite sides of the vehicle and extending upwardly and outwardly toward opposite side walls of the car, means connecting the upper ends of the flexible means to upper parts of the car, and means for permitting limited elongation of the flexible means to permit limited pivotal movement of the thrust rods in the aforesaid plane.

13. The combination with a freight car, or the like, of a thrust rod pivotally connected to a lower part of the car and extending upwardly at an angle to the vertical, means on the upper end of the rod defining an arcuate support for peripherally engaging the lower peripheral surface of a vehicle wheel, and suspension means adjustable as to length for holding the rod in vehicle supporting position.

14. A car loading device comprising a tire supporting shoe constructed of connected tubular pipe sections, supporting arms, and means pivotally connecting the arms to the shoe including certain of said pipe sections which are rotatable relatively to the shoe and about their own longitudinal axes.

15. A car loading device comprising a tire supporting shoe constructed of connected tubular pipe sections, supporting arms, and means pivotally connecting the arms to the shoe including certain of said pipe sections which are rotatable relatively to the shoe and about their own longitudinal axes and which have pipe projections threadedly engaging the arms.

16. In combination with a freight car having a wall recess therein of a depth substantially equal to the thickness of the wall, a car loading device comprising thrust members demountably connected to a lower part of the car and extending upwardly therefrom, means on said members for supporting a vehicle, and means connected to an upper part of the car and operatively connected to the vehicle for partially suspending the vehicle, said device being so constructed and arranged as to be stored in said recess when not in use without being disconnected from said upper part of the car.

17. In combination with a freight car having a wall recess therein, a demountable car loading device comprising thrust members connected to a lower part of the car and extending upwardly therefrom, means on said members for supporting a vehicle, means connected to an upper part of the car and operatively connected to the vehicle for partially suspending the vehicle, said device being so adapted that the second mentioned means may be stored in said recess when not in use without being disconnected from the car, and means for suspending the thrust members in out of way position when not in use.

18. The combination with a freight car having a recess in a wall thereof, demountable means for anchoring a vehicle or the like in the freight car, including thrust members for supporting the automobile and means for partially suspending the vehicle, said demountable means being adapted to be stored in said recess without being disconnected from the car, and means in said recess for supporting said demountable means therein.

19. In combination with a freight car having a recess in the side wall thereof, of means for supporting a wheel of a vehicle, thrust members detachably connected at one end to a lower part of the car and permanently secured to said means in a supporting relation, and flexible means adjustable as to length and permanently interconnecting said car and supporting means for partially suspending the latter, said supporting means being adapted to be stored in said recess without being disconnected from the car.

RAYMOND W. CHALMERS.